John Faussett,
Gate.

No. 122,003.

Patented Dec. 19, 1871.

Witnesses.
Alex. Mahon
H H Doubleday

Inventor.
John Faussett
by his Attorney
A. M. Smith

UNITED STATES PATENT OFFICE.

JOHN FAUSSETT, OF LEONARDTOWN, MARYLAND.

IMPROVEMENT IN GATES.

Specification forming part of Letters Patent No. 122,003, dated December 19, 1871; antedated December 7, 1871.

*To all whom it may concern:*

Be it known that I, JOHN FAUSSETT, of Leonardtown, county of St. Mary's, State of Maryland, have invented a new and useful Improvement in Gates, of which the following is a full, clear, and exact description, reference being had to the accompanying drawing making part of this specification, in which—

Figure 1:
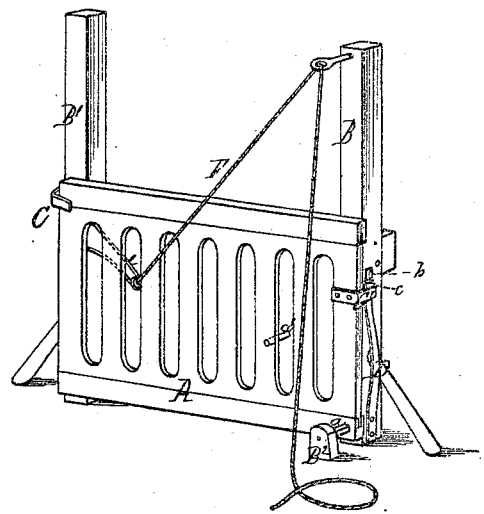
Figure 2:
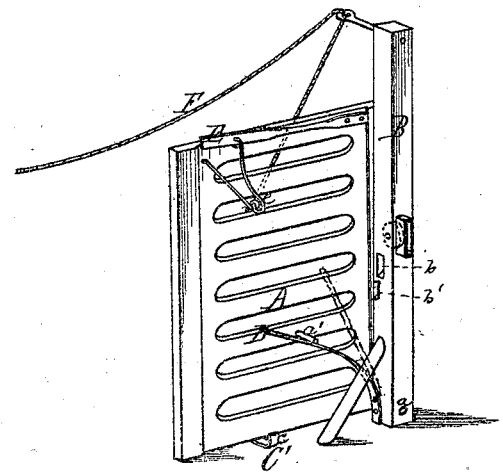
Figure 2:
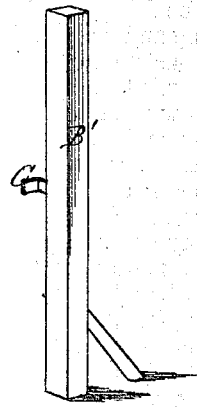

Figure 1 represents the gate closed, and Fig. 2 is a view of the gate when open, taken from the opposite side.

Similar letters of reference denote corresponding parts in both figures.

The invention relates to that class of gates which is mounted upon a transverse horizontal pivot, located near one of its lower corners in such manner that the gate has a vertical vibration, and can be opened by tilting it upon said pivot, the arrangement of parts being such that the weight of the gate retains it in position whether it be open or closed.

The first part of the invention consists in combining with the gate a counterpoise or a spring in a manner that will be fully described, so that it shall assist in opening and closing the gate. The invention further consists in certain details of construction, which will be set forth.

In the drawing, A is the gate, which may be of any desired size or form that shall be adapted to the purpose. B $B^1$ are the posts, to one of which, B, the gate is attached near the ground by means of a transverse pivot, $a$. When thought best one end of the pivot may be supported in a supplemental post, $B^2$, or its equivalent. C is a clasp secured to the post $B^1$, and serving to confine the front or free end of the gate when the gate is closed to the post, one arm of the clasp extending around in front of the gate, as clearly shown in the drawing. $C'$ is another clasp similar in form to clasp C, except that it has a return-arm, $c$, (see Fig. 2.) Clasp $C'$ is attached to the rear or pivoted end of the gate, and when the gate is closed takes into a recess, $b$, in post B, thus assisting in securing that end of the gate in proper position. D is a tongue-spring, applied to post B in such a position that the free end of the spring shall engage with clasp $C'$ and be retracted when the gate is closed. This spring when free occupies about the position shown in dotted lines in Fig. 2. $a'$ is a pin projecting from the gate. As the gate is tilted this pin passes through a slot, $b^1$, cut in post B. E is a spring-latch on the free end of the gate, and projecting beyond the edge, as in Fig. 2, so as to engage with the lower side of clasp C when the gate is closed, as will be readily understood. $e$ is a tripper. One end of the tripper is secured to the gate, the other end being attached to the spring-latch E. The tripper may be made sufficiently elastic to actuate the latch, in which case the latch may be merely pivoted to the gate. F is a cord or rope for operating the gate, one end being connected with the tripper E. The cord is supported upon post B, and may, when preferred, be carried to a point where it can be conveniently reached by a person either on horseback or in a carriage. There may be two of these cords, one upon each side of the gate. When the gate is closed, and it is desired to open it, I take hold of the cord F, and by pulling it first withdraw the latch E from the clasp.

The construction and arrangement of the parts are such that after the latch is released the pull of the rope is exerted to lift the gate into a vertical position, the tension of spring D assisting. By using a little more force than is required to merely lift the gate I am enabled to tilt it over into the position shown in Fig. 2; and it will be seen that in moving into this position the pin $a'$ has engaged with spring D, and deflected it (the spring) in an opposite direction from that shown in Fig. 1. Thus the spring is made to retard the motion of the gate at this point and save a part of the jarring and consequent racking, and also to assist in tilting the gate when it is desired to close it, which is done by again pulling the rope, as will be readily understood without further explanation.

As a substitute for the spring D I propose, under some circumstances, to employ a weight and cord, the cord passing over a pulley, $b^2$, Fig. 2, in post B, and secured to the gate at a suitable point—say where the pin $a'$ is—the weight hanging by the side of the post, the length of the cord being such that when the gate is in either of the positions shown the weight will be suspended, and will of course operate in a manner similar to the spring.

It is apparent that the gate can be opened and closed by hand without the use of the cord under circumstances which render it convenient to do so.

What I claim as new is—

1. In combination with a gate mounted upon a pivot, so that it can be tilted substantially as set forth, a spring, arranged in such manner that it shall be retracted when the gate is either open or closed, as described.

2. In combination with the tilting gate A and post B, the clasp C', and spring D, substantially as set forth.

3. In combination with the tilting gate A and posts B B¹, the clasps C C', spring D, and latch E, substantially as set forth.

In testimony whereof I have hereunto set my hand this 16th day of May, A. D. 1871.

JOHN FAUSSETT.

Witnesses:
   EDM. F. BROWN,
   ALEXR. MAHON.

(52)